United States Patent
Gu et al.

(10) Patent No.: US 12,522,487 B2
(45) Date of Patent: Jan. 13, 2026

(54) SINGLE-MOTOR, DUAL-HYDRAULIC-CIRCUIT DRIVE SYSTEM FOR INDUSTRIAL MATERIALS-HANDLING VEHICLE AND METHOD FOR CONTROLLING THE SAME

(71) Applicant: Hyster-Yale Maximal Forklift (Zhejiang) Co., Ltd., Zhejiang (CN)

(72) Inventors: Binshen Gu, Hangzhou (CN); Timothy Brian Cherry, Hangzhou (CN); Yuanfu Shi, Hangzhou (CN); Xiangxian Song, Hangzhou (CN); Xiaopeng Wang, Hangzhou (CN); Cheng Cao, Hangzhou (CN); Yuan Xu, Hangzhou (CN)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/377,420

(22) Filed: Oct. 6, 2023

(65) Prior Publication Data
US 2024/0116739 A1      Apr. 11, 2024

(51) Int. Cl.
*B66F 9/075*     (2006.01)
*F04B 17/03*     (2006.01)
(Continued)

(52) U.S. Cl.
CPC .......... *B66F 9/07572* (2013.01); *F04B 17/03* (2013.01); *F04B 23/10* (2013.01);
(Continued)

(58) Field of Classification Search
CPC ......... B66F 9/22; B66F 9/205; B66F 9/07572
See application file for complete search history.

(56) References Cited

U.S. PATENT DOCUMENTS 3,841,423 A * 10/1974 Holtkamp ............. F16H 61/456
                                                   180/6.3
3,885,204 A    5/1975 Abels et al.
(Continued)

FOREIGN PATENT DOCUMENTS

CN       1142085 C      2/1997
CN       1405079 A *    3/2003
(Continued)

OTHER PUBLICATIONS

European Extended Search Report, EPO Pat.Appl. 23202023.3 (Mar. 12, 2024).
(Continued)

*Primary Examiner* — Thomas E Lazo

(57) ABSTRACT

A drive system for an industrial handling vehicle comprises an electric motor, a first pump, for example, a plunger pump, and a second pump, for example, a gear pump. The first pump is configured to provide hydraulic power for a travelling device of the industrial handling vehicle. The first pump and the travelling device are in a first hydraulic circuit. The second pump is configured to provide hydraulic power for a brake device and/or a steering device and/or a handling device of the industrial handling vehicle. The second pump, the brake device, the steering device, and the handling device are in a second hydraulic circuit isolated from the first hydraulic circuit. The electric motor is operatively coupled to both the first pump and the second pump, to drive them to operate.

22 Claims, 6 Drawing Sheets

(51) Int. Cl.
*F04B 23/10* (2006.01)
*F04B 23/12* (2006.01)
*F04C 2/08* (2006.01)

(52) U.S. Cl.
CPC .............. *F04B 23/12* (2013.01); *F04C 2/084* (2013.01); *F04C 2240/40* (2013.01)

(56) References Cited

U.S. PATENT DOCUMENTS

| | | | |
|---|---|---|---|
| 4,135,121 A | 1/1979 | Stuhr | |
| 7,841,432 B2 | 11/2010 | Lynn et al. | |
| 2001/0040405 A1* | 11/2001 | Jansen | B60P 1/162 298/1 C |
| 2004/0163893 A1* | 8/2004 | Langen | B66F 9/07572 187/224 |
| 2008/0152513 A1* | 6/2008 | Esders | B66F 9/24 417/411 |
| 2013/0283776 A1* | 10/2013 | He | B66F 9/22 60/459 |
| 2015/0033718 A1* | 2/2015 | Kaneko | F16H 61/47 60/431 |
| 2019/0309845 A1* | 10/2019 | Clark | F16H 61/456 |
| 2022/0267129 A1* | 8/2022 | White | E02F 9/2242 |

FOREIGN PATENT DOCUMENTS

| | | | | |
|---|---|---|---|---|
| CN | 101058395 A | | 10/2007 | |
| CN | 101865107 A | | 10/2010 | |
| CN | 103660928 A | | 3/2014 | |
| CN | 108569653 B | | 9/2018 | |
| DE | 10325127 A1 | * | 12/2004 | .......... B60K 7/0007 |
| DE | 102006060351 | | 4/2008 | |
| EP | 0072233 A1 | * | 2/1983 | |
| JP | 4386754 B2 | | 12/2009 | |
| WO | 2019194968 A1 | | 10/2019 | |

OTHER PUBLICATIONS

First Office Action in Chinese Patent Application No. 202211222763.1 (May 30, 2025).
Communication pursuant to Article 94(3) EPC, EPO Patent Appl. No. 23202026.3 (Aug. 26, 2025).

* cited by examiner

SINGLE-MOTOR, DUAL-HYDRAULIC-CIRCUIT DRIVE SYSTEM FOR INDUSTRIAL MATERIALS-HANDLING VEHICLE AND METHOD FOR CONTROLLING THE SAME

RELATED APPLICATIONS

Priority is claimed pursuant to 35 U.S.C. § 119 to Chinese Patent Disclosure No. 202211222763.1, filed Oct. 8, 2022, entitled "Industrial Handling Vehicle, Drive System Therefor and Method for Controlling the Same," the entire disclosure of which is incorporated by reference herein.

TECHNICAL FIELD

The present disclosure generally relates to an industrial materials-handling vehicle (referred to herein as an "industrial handling vehicle"), such as a forklift, a drive system for the industrial handling vehicle, and a method for controlling the industrial handling vehicle.

BACKGROUND INFORMATION

In an industrial handling vehicle such as a forklift, a drive system therefor is usually hydraulically-powered to drive a travelling device and a handling device of the industrial handling vehicle to operate. Therefore, hydraulic-operating sub-systems must be equipped for the travelling device and the handling device in the industrial handling vehicle, respectively. Hydraulic pumps of the hydraulic-operating sub-systems must be provided with different electric motors as drive sources respectively. Then, the different electric motors must be provided with different electronic control devices therefor respectively. Therefore, relevant electronic control cables will have to be very complicatedly laid out in the industrial handling vehicle.

Furthermore, the existence of the electric motors and the electronic control devices can result in heat that tends to build up during actual operation of the industrial handling vehicle. As the industrial handling vehicle such as the forklift is small in its volume, it may be difficult to sufficiently dissipate the built-up heat by re-configuring the drive system within the industrial handling vehicle in a dispersed manner. Therefore, this may cause the electric motors and the electronic control devices to be frequently shutdown for overheat protection, affecting the industrial handling vehicle's operational reliability. Moreover, electromagnetic interference between the different electronic control devices themselves can also affect the operational reliability. In order to avoid or eliminate the electromagnetic interference, electromagnetic shielding component(s) may have to be added, resulting in increased manufacturing costs of the industrial handling vehicle.

SUMMARY OF DISCLOSURE

For solving, partially or fully, one or more of the above issues, it is proposed that an improved drive system be adopted in an industrial handling vehicle to drive both a travelling device and a handling device of the industrial handling vehicle with good heat dissipation and increased operational reliability of the vehicle.

According to one aspect, a drive system for an industrial handling vehicle comprises an electric motor, a first pump, and a second pump. The first pump is configured to provide hydraulic power for a travelling device of the industrial handling vehicle. The first pump and the travelling device are in a first hydraulic circuit. The second pump is configured to provide hydraulic power for a brake device and/or a steering device and/or a handling device of the industrial handling vehicle. The second pump, the brake device, the steering device and the handling device are in a second hydraulic circuit isolated from the first hydraulic circuit. The electric motor is operatively coupled to both the first pump and the second pump, to drive them to operate.

In one embodiment, the electric motor is an alternating current synchronous electric motor, and the second pump is a gear pump, such as a duplex gear pump.

In one embodiment, a rotational shaft of the electric motor at its opposing ends is coaxially and rotational-fixedly connected to a rotational shaft of the first pump and a rotational shaft of the second pump, respectively.

In one embodiment, the first pump is a plunger pump, such as a variable plunger pump, and the travelling device comprises a hydraulic motor, which together with the variable plunger pump constitutes a closed-type hydraulic subsystem in the first hydraulic circuit.

In one embodiment, a fluid filling pump is provided in the second hydraulic circuit and integrated within the first pump, and a hydraulic fluid circulated in the closed-type hydraulic subsystem by rotation of the rotational shaft of the first pump is first pumped by the fluid filling pump from a second hydraulic fluid storing container in the second hydraulic circuit.

In one embodiment, a regulating valve is provided in the second hydraulic circuit within a hydraulic pipeline between the first pump and the fluid filling pump, and using the regulating valve, the hydraulic fluid pumped by the fluid filling pump can selectively flow back to the hydraulic fluid storing container or flow to the first pump.

In one embodiment, a multi-way valve device is provided in the first hydraulic circuit, wherein a fluid outlet of the second pump is fluidically connected to the brake device and/or the steering device and/or the handling device via the multi-way valve device to ensure that when the electric motor is operating, a sufficient amount of hydraulic fluid is supplied through the multi-way valve device to the brake device and/or the steering device.

In one embodiment, in the first hydraulic circuit, each of the brake device, the steering device and the handling device is configured to have a separated hydraulic pipeline returning to a first hydraulic fluid storing container.

In one embodiment, the electric motor is a variable-speed electric motor, and the hydraulic motor is a variable hydraulic motor.

In one embodiment, a filter device is provided in a hydraulic fluid returning pipeline of the second hydraulic fluid storing container, and the first and second hydraulic fluid storing containers are configured to be in fluid communication with each other.

According to another aspect, an industrial handling vehicle comprises a travelling device, a brake device, a steering device, a handling device, and a drive system as described above and configured to selectively provide hydraulic power for the travelling device, the brake device, the steering device, and the handling device.

In one embodiment, the industrial handling vehicle is a forklift.

According to another aspect, a method controls an industrial handling vehicle provided with a drive system as described above. The method operates an electric motor of the drive system at least at a first specified rotating speed value when the industrial handling vehicle is in a non-travelling state and before a handling device of the industrial handling vehicle is operated, wherein the first specified rotating speed value is the minimum rotating speed value of a rotational shaft of the electric motor required for carrying out a braking function of a brake device of the industrial handling vehicle.

In one embodiment, the electric motor of the drive system is operated at least at a second specified rotating speed value before the industrial handling vehicle is expected to travel, wherein the second specified rotating speed value is greater than the first specified rotating speed value, and the second specified rotating speed value is the minimum rotating speed value of the rotational shaft of the electric motor required for carrying out a normal operation of a travelling device of the industrial handling vehicle.

In one embodiment, if an accelerator pedal of the industrial handling vehicle is pressed within a predefined limit when the industrial handling vehicle is travelling, the discharge of a hydraulic motor of the drive system is regulated directly to its maximum and with the accelerator pedal being pressed, the discharge of a first pump of the drive system is regulated from its maximum to its minimum or following that trend (decreasing or maximum-to-minimum).

In one embodiment, the predefined limit is a percentage between 30% and 70% of the maximum extent to which the accelerator pedal is pressed, and/or wherein the first specified rotating speed value is between 700 RPM (revolutions per minute) and 2100 RPM, and the second specified rotating speed value is between 1500 RPM and 2100 RPM.

In one embodiment, if the accelerator pedal of the industrial handling vehicle is pressed over the predefined limit and a fluid pressure of the first pump is less than or equal to a predefined first pressure threshold, the discharge of the first pump is regulated directly to its maximum and the discharge of the hydraulic motor is regulated from its maximum to its minimum or following that trend with the accelerator pedal being pressed.

In one embodiment, if the accelerator pedal of the industrial handling vehicle is pressed over the predefined limit and a fluid pressure of the first pump is greater than a predefined first pressure threshold, the discharge of the first pump is regulated from its maximum to its minimum or following that trend with the accelerator pedal being pressed, and the discharge of the hydraulic motor is regulated from its minimum to its maximum or following that trend (increasing or minimum-to-maximum) with the accelerator pedal being pressed.

In one embodiment, if the accelerator pedal of the industrial handling vehicle is pressed over the predefined limit and the fluid pressure of the first pump is greater than a predefined second pressure threshold, the discharge of the first pump is regulated from its minimum to its maximum or following that trend with the accelerator pedal being pressed, and the discharge of the hydraulic motor is regulated from its maximum to its minimum or following that trend with the accelerator pedal being pressed, wherein the predefined second pressure threshold is less than the predefined first pressure threshold.

In one embodiment, the predefined first pressure threshold is 24 MPa (megapascals).

In one embodiment, the predefined first pressure threshold is 24 MPa, and the predefined second pressure threshold is 20 MPa.

According to the present disclosure, only a single electric motor can be used in the drive system to meet operational requirements of both the travelling device and the handling device of the industrial handling vehicle. Therefore, the difficulty for laying out relevant electronic control cables can be simplified, possible hot spots of the industrial handling vehicle can be reduced, and it can be easier to re-configure the drive system to enhance heat dissipation and reduce electromagnetic interference caused by relevant electronic control devices themselves, such that the operational reliability of the industrial handling vehicle can be improved. Furthermore, it is convenient to upgrade or reconstruct an existing industrial handling vehicle to use the drive system described herein. Furthermore, the use of the single electric motor can decrease manufacturing costs of the vehicle.

Furthermore, a forklift designed or reconstructed by the technical measures of the present disclosure can be operated more reliably. This is because a prior-art drive system for an industrial handling vehicle, such as a forklift, usually comprises several low-powered electric motors. Therefore, to accomplish a handling operation with relatively heavy load, the low-powered electric motors may be overpower-operated for a short time period. From a long-term perspective view, that can decrease the industrial handling vehicle's operational reliability. However, since the drive system according to the present disclosure can be provided with a single high-powered electric motor, it is not necessary for the single high-powered electric motor to be overpower-operated to accomplish the same heavy-load handling operation. Moreover, a single high-powered electric motor can be operated in a low-power mode whenever possible. Therefore, the long-term operational reliability of the vehicle can be improved.

BRIEF DESCRIPTION OF THE DRAWINGS

The principles and various aspects of the present disclosure will be well understood by the following description in combination with the attached drawings. It should be noted that although the drawings might be given here in different ratios, they will not affect understanding to the present disclosure.

DETAILED DESCRIPTION OF EMBODIMENTS

Figure 1:
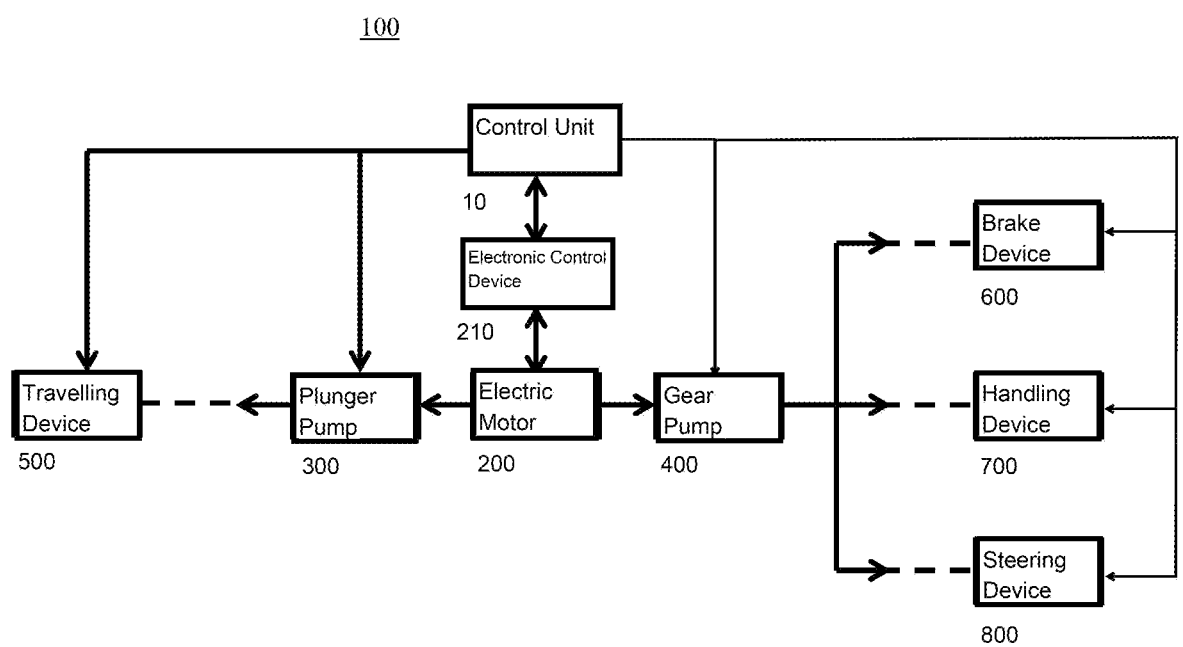
FIG. 1 is a block diagram schematically illustrating a drive system for an industrial handling vehicle according to an embodiment of the present disclosure.

In the drawings of the present disclosure, features having the same configuration or a similar function are represented by the same reference numerals respectively.

FIG. 1 is a block diagram schematically illustrating a drive system 100 for an industrial handling vehicle according to an embodiment of the present disclosure. Although in the context of the present disclosure the industrial handling vehicle is mainly explained by taking it as a forklift for example, it should be understood by a person skilled in the art that the drive system 100 according to the present disclosure can be used for any other suitable industrial vehicle having a travelling device and a handling device or a similar manipulator device.

As shown, the drive system 100 comprises a single electric motor 200. For instance, this single electric motor 200 can be an alternating current (AC) synchronous electric motor. In one embodiment, the electric motor 200 can be an AC speed regulating synchronous electric motor. Furthermore, the drive system 100 also comprises a first pump, such as a plunger pump 300, and a second pump, such as a gear pump 400. In one embodiment, the plunger pump 300 is a closed-circuit-type variable plunger pump, and the gear pump 400 is a duplex gear pump. The electric motor 200 is operatively coupled or connected to the plunger pump 300 and the gear pump 400. In the context of the present disclosure, operatively coupling or connecting the electric motor 200 to the plunger pump 300 and the gear pump 400 means that when a rotational shaft of the electric motor 200 is rotated, both the plunger pump 300 and the gear pump 400 can be driven to operate. In an embodiment, for example, the rotational shaft of the electric motor 200 at its opposing ends can be rotational-fixedly connected to a rotational shaft of the plunger pump 300 and a rotational shaft of the gear pump 400, respectively. Here, (shaft-shaft) "rotational-fixedly connected" for example can be carried out by sleeving a suitable tube around the two co-axial rotational shafts to be rotational-fixedly connected, and then inserting a bolt, crossing the respective shaft's rotational axis, through both the tube and the respective rotational shaft. Of course, it is understood by a person skilled in the art that any other suitable mechanical fixing manner can be adopted in the technical solutions of the present disclosure, by which mechanical fixing manner two shafts can be co-axially connected to each other such that they can be rotated around the same rotational axis. According to one embodiment of the present disclosure, the electric motor 200 is designed such that both ends thereof can be used to synchronously drive the plunger pump 300 and the gear pump 400 and thus the part layout design within the vehicle can be simplified.

Furthermore, the drive system 100 also comprises a travelling device 500. The travelling device 500 is hydraulically powered by the plunger pump 300 such that the industrial handling vehicle, such as a forklift, can travel as an entire vehicle. The travelling device 500 turns wheels that contact the ground or a floor to move the industrial handling vehicle forward or backward (straight or in a curved trajectory per a steering operation). The travelling device 500 may transfer mechanical power to one or more drive wheels via one or more of a transmission, drive shaft, etc.

The drive system 100 also comprises a handling device 700. The handling device 700 is hydraulically powered by the gear pump 400 to accomplish relevant non-traveling operations of the forklift such as lifting, tipping, pitch regulation of two fork arms or the like. Furthermore, the drive system 100 also comprises a brake device 600 and a steering device 800 both for the industrial handling vehicle. These devices can be hydraulically powered by the gear pump 400 to accomplish corresponding braking and steering operations of the vehicle. The plunger pump 300 is configured to be fluid-communication with a hydraulic fluid storing container 310 (shown in FIG. 3) for the plunger pump, and the gear pump 400 is configured to be fluid-communication with a hydraulic fluid storing container 410 (shown in FIG. 3) for the gear pump. Although the hydraulic fluid storing container 310 and the hydraulic fluid storing container 410 can be used to store the same hydraulic fluid therein, the hydraulic fluid storing container 310 and the hydraulic fluid storing container 410 are hydraulically isolated from each other. Therefore, a hydraulic circuit in which the plunger pump 300 and the travelling device 500 are located is isolated from a hydraulic circuit in which the gear pump 400, the brake device 600, the steering device 800 and the handling device 700 are located.

Because fluctuation in hydraulic output of the plunger pump 300 is more stable than that of the gear pump 400, the plunger pump 300 is adapted to driving the travelling device 500. Furthermore, during operation of the handling device 700, the brake device 600 and the steering device 800 of the industrial handling vehicle, relevant action elements might be exposed such that the hydraulic fluid inevitably carries impurities, deteriorating the quality of the hydraulic fluid. The quality requirements of the hydraulic fluid for the gear pump 400 during its operation are lower than that of the plunger pump 300, such that the gear pump 400 is adapted to providing hydraulic power for the handling device 700, the brake device 600 and the steering device 800.

In an alternative embodiment, a filter device can be provided in a hydraulic fluid return pipeline of the hydraulic fluid storing container 410, to filter impurities out of the hydraulic fluid in the hydraulic fluid return pipeline. Therefore, in this case, the hydraulic fluid storing container 310 and the hydraulic fluid storing container 410 can be configured to be fluid-communication with each other.

Furthermore, the drive system 100 may also comprise an electronic control device 210 which is for example equipped for the electric motor 200 to support operation thereof. For example, the electronic control device 210 may comprise a controller, a motor driver, and a feedback transducer. As only a single electric motor 200 is provided in the drive system 100 according to this embodiment, the electronic control device 210 of the electric motor 200 can be readily wired in the forklift as desired. In comparison with the prior art, the wiring design of the present disclosure can be simpler and thus cables can be saved, resulting in decreased manufacturing costs of the forklift. In the meanwhile, due to the fact that only the single electric motor is adopted, the area where hot spots possibly exist is reduced such that the heat dissipation effect of the vehicle during its operation can be improved.

The drive system 100 may comprise a control unit 10. For instance, the control unit 10 may comprise a computer and a memory. Computer programs can be stored in the memory, and can be invoked and executed by the computer. The control unit 10 is connected to the electronic control device 210, a controller of the plunger pump 300, relevant component(s) in the hydraulic circuit where the travelling device 500 locates, a controller of the gear pump 400, and relevant component(s) in the hydraulic circuit where the brake device 600, the steering device 800 and the handling device 700 are located, such that they are controllable under the computer programs as stored and respectively executed. For instance, the control unit 10 can be designed to adjust the velocity of the rotational shaft of the electric motor 200, the discharge (or output) of the plunger pump 300, the discharge (or output) of a hydraulic motor (as mentioned below), or the like.

Figure 2:
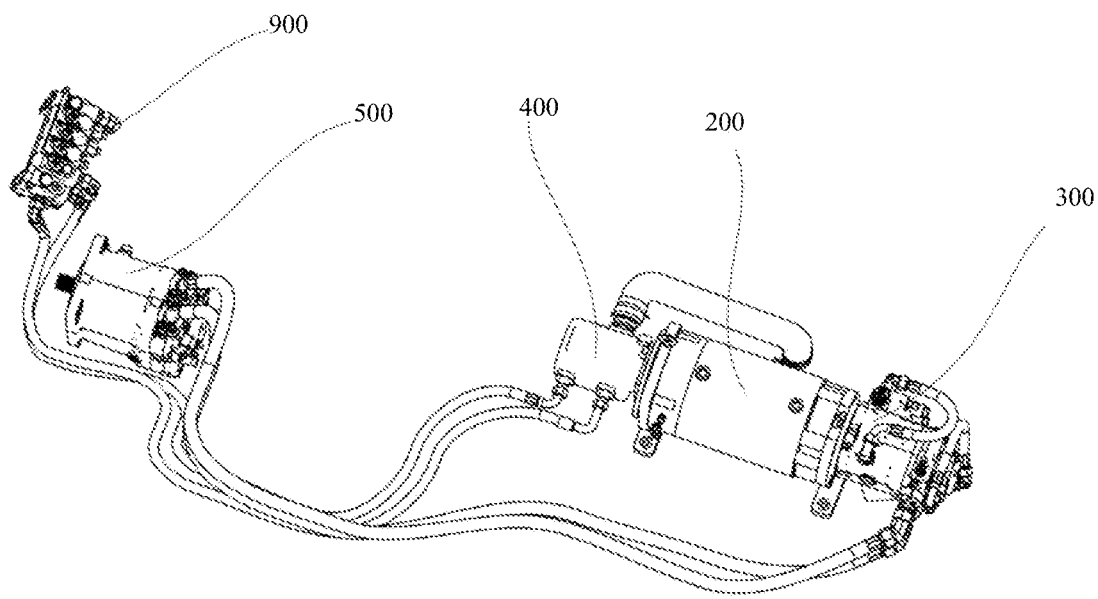
FIG. 2 is a perspective view schematically illustrating a part of the drive system according to an embodiment of the present disclosure.

FIG. 2 is a perspective view schematically illustrating a part of the drive system 100 according to an embodiment of the present disclosure. As shown, a rotational shaft of the electric motor 200 (hidden by an end cover thereof) is designed such that the rotational shaft thereof is at both ends coupled or connected to a rotational shaft of the plunger pump 300 and the rotational shaft of the gear pump 400, respectively. Therefore, when the electric motor 200 is operated, both the plunger pump 300 and the gear pump 400 work. Furthermore, the gear pump 400 is fluidically coupled to a multi-way hydraulic valve device 900 via a hydraulic pipeline. Through the multi-way hydraulic valve device 900, a hydraulic fluid supplied and pressurized by the gear pump 400 can be used to selectively drive, for example, the brake device 600, the steering device 800, and the handling device 700, respectively. For instance, braking of the forklift is controllable by a brake valve device 610 (FIG. 4A) of the brake device 600 which is fluidically connected downstream of the multi-way valve device 900. Therefore, when braking is desired, a brake pedal of the vehicle or the forklift can be pressed by a user to operate the brake valve device 610 to accomplish hydraulically-assisted braking. In other embodiments the brake valve device 610 can be used to operate a spring-applied hydraulically released brake where user operation of a brake pedal causes hydraulic pressure to be lessened such that a spring causes braking to occur. Furthermore, the plunger pump 300 is fluidically coupled to a hydraulic motor 510 (FIG. 3) via a hydraulic pipeline. For instance, the hydraulic motor 510 as a part of the travelling device 500 can be operatively connected to a vehicle wheel of the industrial handling vehicle to drive the industrial handling vehicle to travel. In one embodiment, the hydraulic motor 510 can be a variable hydraulic motor.

Figure 3:
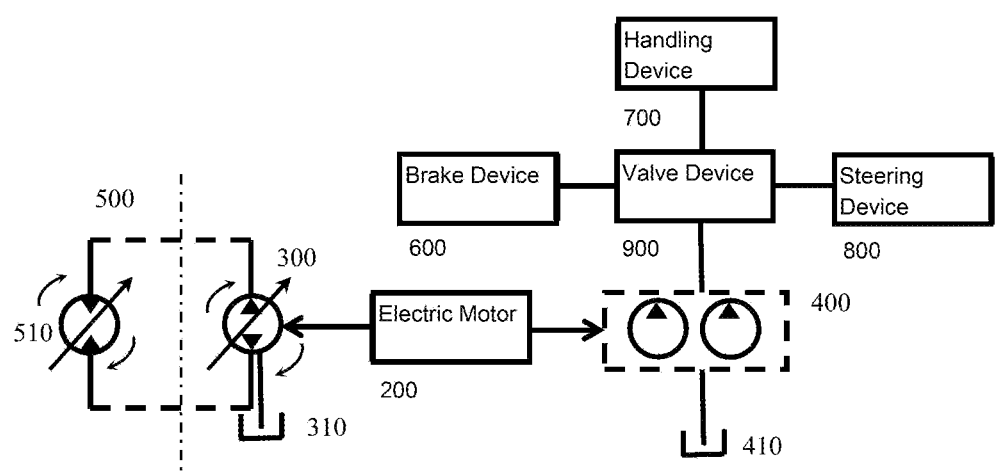
FIG. 3 is a view schematically illustrating a hydraulic circuit of the drive system according to an embodiment of the present disclosure.
Figure 4A:
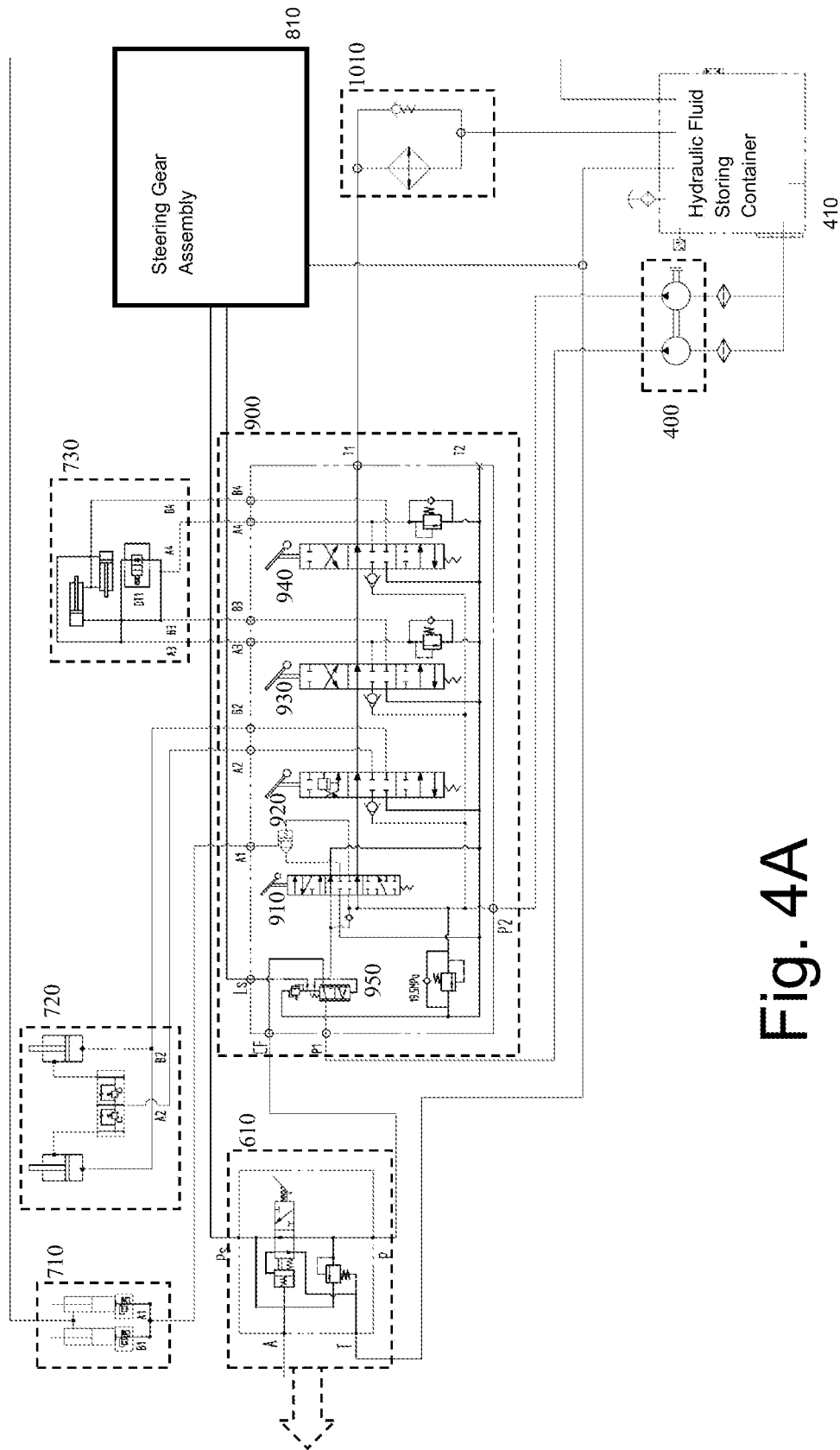
FIG. 4A is a diagram schematically illustrating a portion of the hydraulic circuit of the drive system of FIG. 3.

FIG. 3 is a simplified schematic view illustrating an example of a simplified hydraulic circuit of the drive system 100 according to the present disclosure. FIG. 4A schematically shows an example of the details of a part of the hydraulic circuit of FIG. 3. It should be understood by a person skilled in the art that the hydraulic circuit as shown or its examples are used to schematically and non-limitedly explain the technical solution of the present disclosure. Any other suitable hydraulic circuit designed for working with the drive system 100 here can be adopted in the technical solution of the present disclosure.

Two input ports of the duplex gear pump 400 are coupled to the hydraulic fluid storing container 410 via hydraulic pipelines respectively, each of which hydraulic pipelines is connected in series with a filter. The multi-way hydraulic valve device 900 is provided with two input ports P1 and P2, and several output ports. In an interior of the multi-way hydraulic valve device 900, several hydraulic changeover valves such as valves 910, 920, 930, 940, 950 are arranged between the input ports P1 and P2 and the output ports respectively. The valve 950 is configured to be in communication with the input port P1. The valve 950 is a priority valve, especially a two-position three-way priority valve. The priority valve 950 is configured such that a hydraulic fluid can be preferentially supplied to the brake valve device 610 and a steering gear assembly 810 without electronic control. For instance, the priority valve 950 is configured such that the output ports CF and Ls of the multi-way hydraulic valve device 900 are fluidically connected to the brake valve device 610 of the brake device 600 of the industrial handling vehicle and the steering gear assembly 810 of the steering device 800 of the industrial handling vehicle, respectively. In the context of the present disclosure, "fluidically connected" between two features means that the two features are connected to each other (for example via a pipeline) in such a way that a fluid can be conveyed therebetween. Because braking and steering may be the top prioritized operational requirements in the process of the industrial handling vehicle travelling, the priority valve 950 may be configured such that the input port P1 is always in fluid communication with the input ports of the brake valve device 610 and the steering gear assembly 810 no matter which state the priority valve 910 is switched into. In this way, when the duplex gear pump 400 is driven by the electric motor 200 to operate, a sufficient amount of hydraulic fluid can be supplied through the multi-way hydraulic valve device 900 to the brake valve device 610 and the steering gear assembly 810, for reliable operations of the brake valve device 610 and the steering gear assembly 810 of the industrial handling vehicle.

Furthermore, other valves such as 910, 920, 930, 940 arranged in the multi-way hydraulic valve device 900 can be manually-operated valves such that they can be readily manually operated by a user of the industrial handling vehicle as required. For example, in the embodiment as shown, these manually-operated valves can be three-position eight-way valves configured to be connected in parallel with the input port P2 of the multi-way hydraulic valve device 900, respectively. For instance, as shown, these valves 910, 920, 930, 940 can be fluidically connected to a lift cylinder module 710, a tip cylinder module 720, and a fork adjusting cylinder module 730, which can be parts of the handling device 700, respectively. For instance, the relevant modules can be configured to control lifting, tipping of a frame of the forklift, and arm distance adjusting of the fork, respectively. The multi-way hydraulic valve device 900 is configured such that a hydraulic fluid can be selectively supplied through the input port P1 to the brake valve device 610 and the steering gear assembly 810, and a hydraulic fluid can be selectively supplied through the input port P2 to the lift cylinder module 710, the tip cylinder module 720, and the fork adjusting cylinder module 730 independently from the formers.

Each of the manually-operated valves 910, 920, 930, 940 is configured such that when the respective valve is in its neutral position, a hydraulic fluid is first supplied by the gear pump 400 from the input port P2 to the multi-way hydraulic valve device 900, and then is discharged from the output port T1 of the multi-way hydraulic valve device 900 such that the hydraulic fluid can return to the hydraulic fluid storing container 410 via a hydraulic fluid heat sink 1010. Now, as no hydraulic fluid is supplied to the lift cylinder module 710, the tip cylinder module 720, and the fork adjusting cylinder module 730, the handling device 700 is in an idle state in which those modules do not work.

Consider the manually-operated valve 910 for example. If each of the manually-operated valves 920, 930, 940 is in their respective neutral position and the manually-operated valve 910 is switched into a lower position as shown, a hydraulic path from the input port P2 to a node A1 is open. Now, a hydraulic fluid supplied by the gear pump 400 can be conveyed to the lift cylinder module 710 through the open hydraulic path such that lifting-up of the frame of the forklift can be carried out for example. This case corresponds to the symbol "+" in column A1 of Table 1. If the manually-operated valve 910 is switched into an upper position as shown and each of the manually-operated valves 920, 930, 940 is still in their respective neutral position, a hydraulic path from a node B1 to the hydraulic fluid heat sink 1010 is open such that lifting-down of the frame of the forklift can be carried out for example. This case corresponds to the symbol "+" in column B1 of Table 1. Similarly, Table 1 schematically shows relevant operations of the handling device 700 using the multi-way hydraulic valve device 900 when the gear pump 400 is operating.

Table 1 showing relevant operations/hydraulic paths of the handling device using the multi-way hydraulic valve device.

|  | A1 | B1 | A2 | B2 | A3 | B3 | A4 | B4 | DT1 |
|---|---|---|---|---|---|---|---|---|---|
| Lifting-up frame of forklift (710) | + | | | | | | | | |
| Lifting-down frame of forklift (710) | | + | | | | | | | |
| Tipping-forward frame of forklift (720) | | | + | | | | | | |
| Tipping-backward frame of forklift (720) | | | | + | | | | | |
| Moving all fork arms leftward (730) | | | | | + | | | | |
| Moving all fork arms rightward (730) | | | | | | + | | | |
| Moving only right fork arm rightward (730) | | | | | | | + | | |
| Moving only right fork arm leftward (730) | | | | | | | | + | |
| Moving fork arms away (730) | | | | | | | | + | + |
| Moving fork arms together (730) | | | | | | | + | + | |

As shown by FIG. 3, in one embodiment of the present disclosure, the plunger pump 300, especially a closed-loop two-way variable plunger pump 300 together with the hydraulic motor 510 as the part of the travelling device 500 constitutes a closed hydraulic subsystem, in which a fluid inlet and a fluid outlet of the variable plunger pump 300 are connected to a fluid inlet and a fluid outlet of the hydraulic motor 510 respectively via hydraulic pipelines. The closed-loop two-way variable plunger pump 300 is suitable for driving the hydraulic motor 510 in the technical solution of the present disclosure because the closed-loop two-way variable plunger pump 300 is provided with an actuating element for regulating the pump's discharge (for example from zero to the maximum) and/or the direction of the pumped hydraulic fluid. An output shaft of the hydraulic motor 510 is operatively connected to the vehicle's wheel to drive it to rotate. Depending on the direction of the hydraulic fluid, the fluid inlet and outlet of the variable plunger pump 300 and of the hydraulic motor 510 can be reversed, respectively.

Figure 4B:
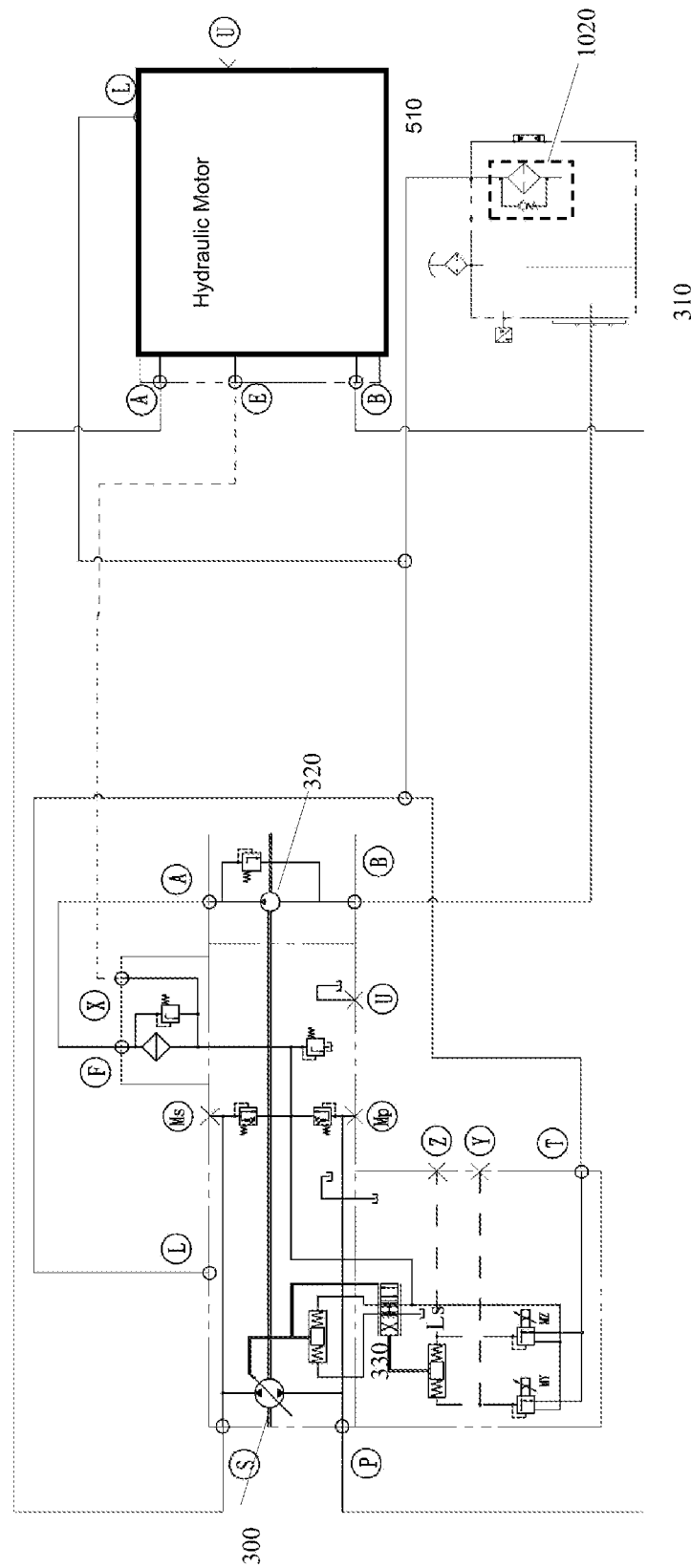
FIG. 4B is a diagram schematically illustrating another portion of the hydraulic circuit of the drive system of FIG. 3.

FIG. 4B schematically illustrates another portion of the hydraulic circuit of FIG. 3 including the variable plunger pump 300. As shown, in order to avoid leakage of the hydraulic fluid out of the closed-type hydraulic subsystem causing low work efficiency, a fluid filling pump 320 is equipped for the variable plunger pump 300. For instance, this fluid filling pump 320 can be integrated together with the variable plunger pump 300, and may be configured to share the rotational shaft of the variable plunger pump 300. The hydraulic fluid storing container 310 may be fluidically connected to an inlet of the fluid filling pump 320 via a hydraulic pipeline, and an outlet of the fluid filling pump 320 may be fluidically connected to the variable plunger pump 300 via a hydraulic pipeline. The fluid inlet and outlet of the variable plunger pump 300 are connected to the fluid inlet and outlet of the hydraulic motor 510 respectively via the hydraulic pipelines. A regulating valve 330, for example an electromagnetic regulating valve, is disposed in the hydraulic pipeline between the fluid filling pump 320 and the variable plunger pump 300. According to instructions from the control unit 10, the regulating valve 330 can accomplish relevant operations. This regulating valve 330 can be a three-position four-way valve. Depending on the direction of the hydraulic fluid conveyed by the variable plunger pump 300, the regulating valve 330 can be controlled to be in a left or right position as shown. For example, in the embodiment as shown, when the regulating valve 330 is controlled to be in the right position as shown, the variable plunger pump 300 operates such that a hydraulic fluid is first sucked from the hydraulic fluid storing container 310 by the fluid filling pump 320, supplied into the variable plunger pump 300, pressurized there, and then discharged into the hydraulic motor 510 to drive the same to operate. During this process, the output discharge of the variable plunger pump 300 can be regulated, for example from zero to the rated maximum output discharge, such that the output power of the hydraulic motor 510 can be regulated as required.

When the electric motor 200 is operating, it is sometimes desired to stop the industrial handling vehicle travelling and in the meanwhile operate the handling device 700. In this case, for the embodiment as shown, the regulating valve 330 can be switched into a neutral position as shown such that although the electric motor 200 is operating, both the variable plunger pump 300 and the fluid filling pump 320 can be in fluid communication with a node L due to the housing design of the variable plunger pump 300. Therefore, the hydraulic fluid is able to flow respectively from the node L, through the hydraulic pipeline and a hydraulic fluid heat sink 1020, and finally return to the hydraulic fluid storing container 310.

The hydraulic circuit portions as shown by FIGS. 4A and 4B can be combined together to ensure that during operation of the electric motor 200, any one of the travelling device 500, the handling device 700, the brake device 600, and the steering device 800 is switchable between an off-working mode and a working mode as required. In this way, although the single electric motor 200 is adopted in one embodiment of the present disclosure to drive the variable plunger pump 300 and/or the gear pump 400, functions of the industrial handing vehicle work normally.

Consider a 10-ton forklift for example. If this forklift is designed according to the prior art and its hydraulic circuit is embodied in the form as shown by FIG. 3, it can be calculated that an electric motor of 35 kW (kilowatt) and a frequency convertor are required to be equipped for the travelling device and that two electric motors of 26 kW are also required to be equipped for the handling device. Contrarily, if this forklift is designed according to the present disclosure, it can also be calculated that only a single electric motor of 75 kW is sufficient. In comparison with the prior art, the design of the present disclosure may be advantageous at least in that the weight of the industrial handling vehicle can be reduced, the wiring length and difficulty can be also decreased, the number of possible hot spots during the vehicle's operation can be reduced to facilitate heat dissipation thereof, and the manufacturing costs of the vehicle can be lowered.

Although the duplex gear pump is used in the above examples or embodiments to explain the technical solutions of the present disclosure, it should be understood by a person skilled in the art that a single gear pump can be designed and used to provide hydraulic power for the brake device 600, the steering device 800, and the handling device 700. In the case of the single gear pump, the multi-way hydraulic valve device 900 may be re-designed such that the multi-way hydraulic valve device 900 has just one hydraulic fluid input port; and the hydraulic circuit of the multi-way hydraulic valve device 900 may be designed such that the hydraulic power fed in via the input port can be transmitted independently to the brake device 600, the steering device 800, or the handling device 700 as required. Any suitable design known by a person skilled in the art can be used to implement the technical solutions described herein.

Figure 5:
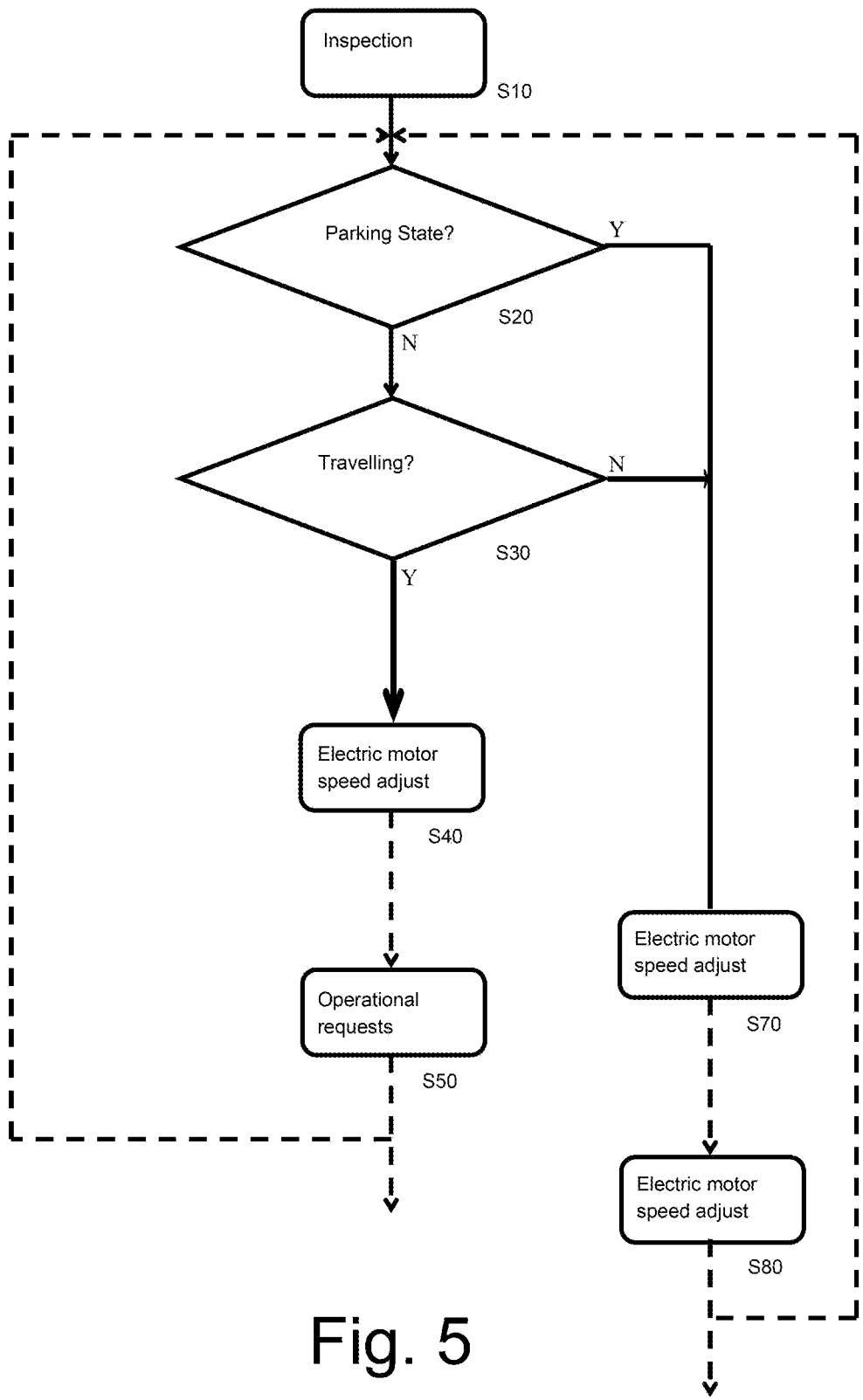
FIG. 5 is a flow chart schematically illustrating a method for controlling the industrial handling vehicle according to an embodiment of the present disclosure.

FIG. 5 schematically illustrates an example of a method for controlling an industrial handling vehicle such as a forklift using the drive system of the present disclosure. It should be understood by a person skilled in the art that the respective controlling method or process or sub-process which might be mentioned below can be stored as a computer program in the memory of the drive system 100 and the computer program can be invoked and executed by the control unit 10 as required. Furthermore, although the controlling method of the present disclosure is explained below with respect to the forklift for example, it should be understood by a person skilled in the art that the controlling method of FIG. 5 can be used for the drive system involved in any embodiments and/or preferred examples and/or alternative examples as mentioned in the present disclosure and any other suitable industrial handling vehicles.

As shown by FIG. 5, at step S10, self-inspection and/or preparation of the forklift is carried out before its operation. Then, at step S20, it is determined whether the forklift is in a parking state. In the context of the present disclosure, "the parking state" means that a handbrake of an industrial handling vehicle such as the forklift has been operated (for example, pulled up) such that the industrial handling vehicle is prevented (or temporarily prevented) from travelling. For instance, such determination can be carried out by a sensor which is configured to detect a state of the handbrake of the forklift. The purpose of step S20 is mainly to determine whether the forklift stands still. The parking state can be as a prerequisite for a handling operation carried out by the industrial handing vehicle. Of course, it should be understood by a person skilled in the art that the prerequisite for the handling operation carried out by the industrial handing vehicle can be more than the parking state. If the determination result of step S20 is Yes (Y), the process (or method) goes to step S70; or if the determination result of step S20 is No (N), the process (or method) goes to step S30.

In the controlling method example of the present disclosure, if it has been determined that the forklift is in the parking state and it is required to carry out some handling operations (such as manipulating the frame and/or the fork arms) by the forklift, speed-adjustment for the electric motor 200 of the drive system 100 is carried out at step S70 such that the rotating speed of the rotational shaft of the electric motor 200 is kept substantially at a first specified rotating speed value. This first specified speed value is defined as the minimum speed value of the rotational shaft of the electric motor 200 required for carrying out the basic braking function of the brake device 600 of the forklift. For instance, the first specified rotating speed value can be 700 RPM (Revolutions Per Minute). The existence of the first specified rotating speed value is because the electric motor of the drive system of the present disclosure is used to drive both the gear pump and the plunger pump, which gear pump is configured to provide hydraulic power for the brake device 600, the steering device 800, and the handling device 700 of the forklift. When the electric motor 200 is operating, the brake device 600 may be maintained to normally work whenever necessary such that the parking forklift can be reliably braked. Therefore, in the parking state of the forklift, even if no handling operations are required to be carried out, a certain amount of hydraulic power is be provided and sustained for the brake device 600 for braking the vehicle, i.e., the electric motor 200 is kept to operate at the first specified rotating speed value.

Then, at step S80, manual manipulation of a user on a respective input device such as a handle of the forklift can control the speed-adjustment of the electric motor 200 such that the hydraulic fluid's discharge as supplied by the electric motor can be increased or decreased correspondingly. For example, under such control, the rotating speed of the rotational shaft of the electric motor 200 can be changed between 700 RPM and 2100 RPM as desired. In the meanwhile, the user can also manually switch the modes of the manually-operated valves 910, 920, 930, 940 respectively to accomplish relevant handling operations (as shown by Table 1).

At step S30, it is determined whether the forklift is travelling. In the context of the present disclosure, in addition to that the handling operations can be accomplished in the parking state, it is also feasible that the handling operations can be accomplished in a non-travelling state of the industrial handling vehicle such as the forklift other than the parking state as soon as the industrial handling vehicle such as the forklift does not travel in that non-travelling state. For instance, such determination can be carried out by detecting relevant gear signals from a cockpit of the forklift (for example, detecting whether the forward gear is hung). Alternatively, such determination can be carried out by detecting signals from various sensors installed in the forklift. For example, signals received from an acceleration sensor, a brake sensor or the like of the forklift can be used to determine whether the forklift is travelling. Furthermore, it is also feasible to detect whether an accelerator pedal in the cockpit of the forklift is pressed. If the forward gear is hung and the accelerator pedal is pressed, the forklift will be regarded to tend to travel or be travelling. According to the controlling method of the present disclosure, the priority of the travelling operation of the forklift is higher than that of the handling operation of the forklift. For instance, if the discharge of the plunger pump is regulated to be zero, the self-locking characteristic of the closed-type hydraulic subsystem will enable the hydraulic motor not to work. In this case, the forklift is unable to travel.

Therefore, if the determination result of step S30 is Y, the process goes to step S40. At step S40, the speed-adjustment of the electric motor 200 of the drive system 100 is carried out such that the rotating speed of the rotational shaft of the electric motor 200 is kept substantially at a second specified rotating speed value which is greater than the first specified rotating speed value. The second specified rotating speed value is defined as the minimum rotating speed value of the rotational shaft of the electric motor 200 required for maintaining the normal operations of the handling device 700 of the forklift. For instance, the second specified rotating speed value can be 1500 RPM. Because the second specified rotating speed value is greater than the first specified rotating speed value, both the brake device and the travelling device can be enabled to work normally when the electric motor 200 operates at the second specified rotating speed value.

Then, at step S50, the rotating speed of the electric motor and the steering device or the like can be controlled depending on travelling operational requests (such as accelerating, steering or the like) made by a user in the cockpit of the forklift.

If the determination result of step S30 is N, the process goes to steps S70 and S80 such that a user can carry out some handling operations by the handing device.

Figure 6:
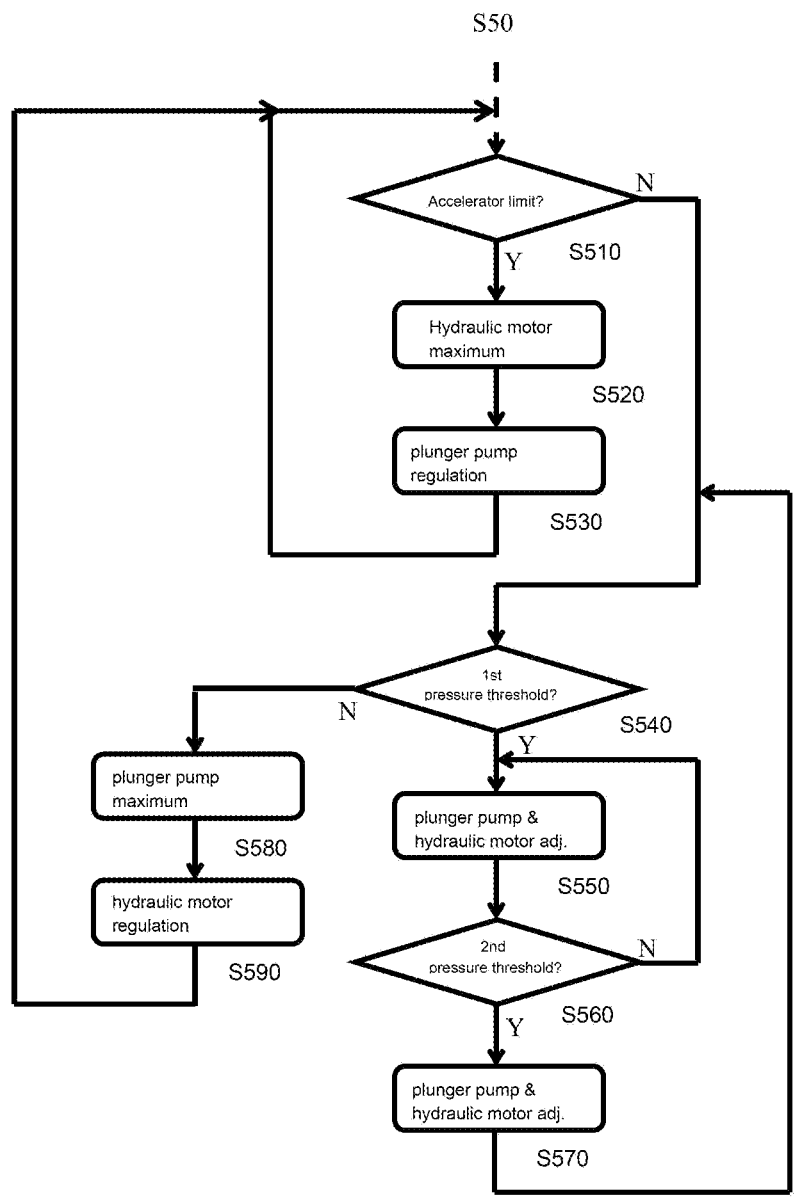
FIG. 6 is a flow chart schematically illustrating a sub-process of the controlling method of FIG. 5.

According to the drive system of the present disclosure, the discharge of the plunger pump and/or the discharge of the hydraulic motor and/or the rotating speed of the rotational shaft of the electric motor is controllable individually or at the same time. Especially for the travelling operation of the forklift (such as when ascending up a hill or climbing over an obstacle), over-pressing the accelerator pedal by a user to increase the rotating speed of the rotational shaft of the electric motor 200 may not let the hydraulic motor's output power arrive at its optimum state. Therefore, FIG. 6 schematically illustrates an example of a sub-process which can be adopted in the respective travelling operation of the controlling method (such as at step S50).

At step S510, it is determined whether the accelerator pedal is pressed within a predefined limit. For example, the predefined limit can be specified as 70%, 60%, 50%, 40%, 30% of the maximum extent to which the accelerator pedal is pressed or any other percentage between 30% and 70% of the maximum extent to which the accelerator pedal is pressed.

If it has been determined that the accelerator pedal is pressed less than the predefined limit (i.e., if the determination result of step S510 is Y), the user is deemed to have an accelerating requirement for the forklift's normal travelling. Therefore, the sub-process goes to step S520. At step S520, the discharge of the hydraulic motor 510 is regulated directly to its maximum. Then, at step S530, depending on the extent to which the accelerator pedal is pressed by the user, the discharge of the plunger pump 300 can be regulated from its maximum to its minimum or following that trend, so that the discharge regulating relation between the plunger pump 300 and the hydraulic motor 510 corresponds to the actual requirement of the user.

If it has determined that the accelerator pedal is pressed equal to or beyond the predefined limit (i.e., if the determination result of step S510 is N), the user is deemed to have (1) an accelerating requirement for the forklift's normal travelling or (2) a requirement for the forklift ascending up a hill or climbing over an obstacle. The two requirements (1) and (2) involve different controls of the plunger pump and the hydraulic motor. In the former case, the rotating speed of the hydraulic motor is increased. In the latter case, the hydraulic motor's output torque is increased. When it is required for the forklift to ascend uphill or climb over an obstacle, the rotating speed of the rotational shaft of the electric motor is increased correspondingly as the accelerator pedal is being pressed by the user. In the meanwhile, if the forklift does not travel, a pressure of the fluid at the plunger pump 300 (or called as the fluid pressure of the plunger pump) will increase correspondingly. For instance, relevant data of the plunger pump 300 (such as the fluid pressure) can be real-time measured and transmitted to the control unit 10.

Therefore, a first pressure threshold can be set for the plunger pump 300 in advance. If an actually measured value of the fluid pressure of the plunger pump 300 is greater than the first pressure threshold, the travelling requirement for the forklift travelling is mainly regarded to increase the travelling device's output torque. For instance, the first pressure threshold can be 24 MPa or any other suitable value which can be set before the vehicle leaves the factory or after it has been used.

Therefore, at step S540, it is determined whether the fluid pressure of the plunger pump 300 is greater than the first pressure threshold. If the determination result of step S540 is N, the travelling requirement for the forklift is mainly regarded to increase the rotating speed of the rotational shaft of the hydraulic motor. Therefore, at step S580, the discharge of the plunger pump 300 is set directly to its minimum. At step S590, depending on the extent to which the accelerator pedal is pressed by the user, the discharge of the hydraulic motor 510 can be regulated from its maximum to its minimum or following that trend, so that the discharge regulating relation between the plunger pump 300 and the hydraulic motor 510 corresponds to the controlling requirement for the forklift.

If the determination result of step S540 is Y, the travelling requirement for the forklift is mainly regarded to increase the travelling device's output torque. At step S550, depending on the extent to which the accelerator pedal is pressed by the user, the discharges of the plunger pump 300 and the hydraulic motor 510 can be adjusted simultaneously or successively such that the discharge of the plunger pump 300 can be regulated from its maximum to its minimum or following that trend and the discharge of the hydraulic motor 510 can be regulated from its minimum to its maximum or following that trend. This can ensure that the travelling device works in a mode of mainly increasing its output torque.

Then, at step S560, it is determined whether the current fluid pressure of the plunger pump 300 is less than a predefined second pressure threshold which is slightly less than the first pressure threshold. For example, the second pressure threshold can be set as 20 MPa or a suitable value less than the first pressure threshold. The existence of the second pressure threshold is to determine whether the travelling requirement for the forklift is still mainly to increase the output torque of the travelling device and to prevent the operation of the forklift from being frequently changed (such being frequently switched between a mode of mainly increasing the rotating speed of the rotational shaft of the hydraulic motor and a mode of mainly increasing the output torque of the travelling device). If the determination result of step S560 is N, the sub-process goes to step S550. If the determination result of step S560 is Y, the operational requirement for the forklift now is regarded to be switched from the mode of mainly increasing the output torque of the travelling device to the mode of mainly increasing the rotating speed of the rotational shaft of the hydraulic motor. Therefore, at step S570, as the accelerator pedal is being pressed by the user, the discharges of the plunger pump 300 and the hydraulic motor 510 can be adjusted simultaneously or successively such that the discharge of the plunger pump 300 is regulated from its minimum to its maximum or following that trend and the discharge of the hydraulic motor 510 is regulated from its maximum to its minimum or following that trend. This can ensure that the travelling device works in a manner of mainly increasing the rotating speed of the rotational shaft of the hydraulic motor.

According to the controlling method of the present disclosure, the operational safety of the forklift in its parking state can be enhanced. Furthermore, when the forklift is travelling, pressing the accelerator pedal can be consistent with the actual requirements of a user.

Although some specific embodiments of the present disclosure have been described here, they are given for illustrative purposes only and cannot be deemed to constrain the scope of the present disclosure in any way. Furthermore, it should be understood by a person skilled in the art that the embodiments described here can be arbitrarily combined with each other. Without departing from the spirit and scope of the present disclosure, various modifications, alterations and reconstructions can be thought out and adopted.

The invention claimed is:
1. A drive system for an industrial handling vehicle, the drive system comprising:
   an electric motor;

a first pump configured to provide hydraulic power for a travelling device of the industrial handling vehicle, the first pump and the travelling device being in a first hydraulic circuit; and a second pump configured to provide hydraulic power for a brake device and/or a steering device and/or a handling device of the industrial handling vehicle, the second pump, the brake device, the steering device, and the handling device being in a second hydraulic circuit isolated from the first hydraulic circuit;

wherein the electric motor is operatively coupled to both the first pump and the second pump to drive them to operate, and wherein the drive system is configured to rotate a rotational shaft of the electric motor at least at a minimum rotating speed required for carrying out a braking function of the brake device in a non-travelling state of the industrial handling vehicle.

2. A drive system as recited in claim 1, wherein the electric motor is an alternating current synchronous electric motor, and the second pump is a duplex gear pump.

3. A drive system as recited in claim 1, wherein a rotational shaft of the electric motor at its opposing ends is coaxially and rotational-fixedly connected to a rotational shaft of the first pump and a rotational shaft of the second pump respectively.

4. A drive system as recited in claim 1, wherein the first pump is a variable plunger pump, and the travelling device comprises a hydraulic motor which together with the variable plunger pump constitutes a closed-type hydraulic subsystem in the first hydraulic circuit.

5. A drive system as recited in claim 1, wherein a fluid filling pump is provided in the second hydraulic circuit and integrated within the first pump, wherein a hydraulic fluid circulated in a closed hydraulic subsystem by rotation of a rotational shaft of the first pump is first pumped by the fluid filling pump from a second hydraulic fluid storing container in the second hydraulic circuit.

6. A drive system as recited in claim 5, wherein a regulating valve is provided in the first hydraulic circuit within a hydraulic pipeline between the first pump and the fluid filling pump, wherein using the regulating valve, the hydraulic fluid pumped by the fluid filling pump can selectively flow back to the hydraulic fluid storing container or flow to the first pump.

7. A drive system as recited in claim 6, wherein a multi-way valve device is provided in the second hydraulic circuit, wherein a fluid outlet of the second pump is fluidically connected to the brake device and/or the steering device and/or the handling device via the multi-way valve device to ensure that when the electric motor is operating, a sufficient amount of hydraulic fluid is supplied through the multi-way valve device to operate the brake device and/or the steering device.

8. A drive system as recited in claim 7, wherein in the second hydraulic circuit, each of the brake device, the steering device and the handling device is configured to have a separated hydraulic pipeline returning to a first hydraulic fluid storing container.

9. A drive system as recited in claim 8, wherein a filter device is provided in a hydraulic fluid returning pipeline of the second hydraulic fluid storing container.

10. A drive system as recited in claim 1, wherein the electric motor is a variable-speed electric motor, and the hydraulic motor is a variable hydraulic motor.

11. An industrial handling vehicle, comprising:
a travelling device;
a brake device;
a steering device;
a handling device; and
a drive system configured to selectively provide hydraulic power for the travelling device, the brake device, the steering device, and the handling device, the drive system comprising:
an electric motor;
a first pump configured to provide hydraulic power for a travelling device of the industrial handling vehicle, the first pump and the travelling device being in a first hydraulic circuit; and
a second pump configured to provide hydraulic power for a brake device and/or a steering device and/or a handling device of the industrial handling vehicle, the second pump, the brake device, the steering device and the handling device being in a second hydraulic circuit isolated from the first hydraulic circuit;
wherein the electric motor is operatively coupled to both the first pump and the second pump to drive them to operate, and
wherein the drive system is configured to rotate a rotational shaft of the electric motor at least at a minimum rotating speed required for carrying out a braking function of the brake device in a travelling state of the industrial handling vehicle.

12. An industrial handling vehicle as recited in claim 11, wherein the industrial handling vehicle is a forklift, the first pump comprises a plunger pump, and the second pump comprises a gear pump.

13. A method for controlling an industrial handling vehicle provided with a drive system comprising an electric motor, a first pump, and a second pump, wherein the first pump is configured to provide hydraulic power for a travelling device of the industrial handling vehicle, wherein the first pump and the travelling device are in a first hydraulic circuit, wherein the second pump is configured to provide hydraulic power for a brake device and/or a steering device and/or a handling device of the industrial handling vehicle, wherein the second pump, the brake device, the steering device and the handling device are in a second hydraulic circuit isolated from the first hydraulic circuit, and wherein the electric motor is operatively coupled to both of the first pump and the second pump to drive them to operate, the method comprising:
operating an electric motor of the drive system at least at a first specified rotating speed value when the industrial handling vehicle is in a non-travelling state and before a handling device of the industrial handling vehicle is operated, wherein the first specified rotating speed value is a minimum rotating speed value of a rotational shaft of the electric motor required for carrying out a braking function of a brake device of the industrial handling vehicle.

14. A controlling method as recited in claim 13, wherein the electric motor of the drive system is operated at least at a second specified rotating speed value before the industrial handling vehicle is expected to travel, wherein the second specified rotating speed value is greater than the first specified rotating speed value, and the second specified rotating speed value is the minimum rotating speed value of the rotational shaft of the electric motor required for carrying out a normal operation of a travelling device of the industrial handling vehicle.

15. A controlling method as recited in claim 13, wherein if an accelerator pedal of the industrial handling vehicle is pressed within a predefined limit when the industrial handling vehicle is travelling, a discharge of a hydraulic motor of the drive system is regulated directly to its maximum, and with the accelerator pedal being pressed, a discharge of the first pump is regulated from its maximum to its minimum or following a decreasing trend.

16. A controlling method as recited in claim 15, wherein the predefined limit is a percentage between 30% and 70% of a maximum extent to which the accelerator pedal is pressed, and/or wherein the first specified rotating speed value is between 700 RPM and 2100 RPM, and the second specified rotating speed value is between 1500 RPM and 2100 RPM.

17. A controlling method as recited in claim 16, wherein if the accelerator pedal of the industrial handling vehicle is pressed over the predefined limit and a fluid pressure of the first pump is less than or equal to a predefined first pressure threshold, a discharge of the first pump is regulated directly to its maximum and the discharge of the hydraulic motor is regulated from its maximum to its minimum or following a decreasing trend with the accelerator pedal being pressed.

18. A controlling method as recited in claim 16, wherein if the accelerator pedal of the industrial handling vehicle is pressed over the predefined limit and a fluid pressure of the first pump is greater than a predefined first pressure threshold, a discharge of the first pump is regulated from its maximum to its minimum or following a decreasing trend with the accelerator pedal being pressed, and a discharge of the hydraulic motor is regulated from its minimum to its maximum or following an increasing trend with the accelerator pedal being pressed.

19. A controlling method as recited in claim 18, wherein if the accelerator pedal of the industrial handling vehicle is pressed over the predefined limit and the fluid pressure of the first pump is greater than a predefined second pressure threshold, a discharge of the first pump is regulated from its minimum to its maximum or following an increasing trend with the accelerator pedal being pressed, and the discharge of the hydraulic motor is regulated from its maximum to its minimum or following a decreasing trend with the accelerator pedal being pressed, wherein the predefined second pressure threshold is less than the predefined first pressure threshold.

20. A controlling method as recited in claim 17, wherein the predefined first pressure threshold is 24 MPa.

21. A controlling method as recited in claim 19, wherein the predefined first pressure threshold is 24 MPa, and the predefined second pressure threshold is 20 MPa.

22. A controlling method as recited in claim 13, wherein the industrial handling vehicle is a forklift, the first pump is a plunger pump, and the second pump is a gear pump.

* * * * *